United States Patent
Lo et al.

(10) Patent No.: US 8,094,668 B1
(45) Date of Patent: *Jan. 10, 2012

(54) PHYSICAL LAYER DEVICE INCLUDING A SERIAL MEDIA INDEPENDENT INTERFACE (SMII)

(75) Inventors: William Lo, Cupertino, CA (US); Nafea Bishara, San Jose, CA (US)

(73) Assignees: Marvell International Ltd., Hamilton (BM); Marvell Israel (M.I.S.L.) Ltd., Yokneam (IL)

( * ) Notice: Subject to any disclaimer, the term of this patent is extended or adjusted under 35 U.S.C. 154(b) by 21 days.

This patent is subject to a terminal disclaimer.

(21) Appl. No.: 12/714,746

(22) Filed: Mar. 1, 2010

Related U.S. Application Data

(63) Continuation of application No. 11/378,551, filed on Mar. 17, 2006, now Pat. No. 7,672,326, which is a continuation of application No. 10/010,732, filed on Dec. 5, 2001, now Pat. No. 7,042,893.

(51) Int. Cl.
*H04L 12/28* (2006.01)
(52) U.S. Cl. ...................................... 370/419
(58) Field of Classification Search ................. 370/419, 370/463, 414, 503, 512, 401, 507, 509, 281, 370/295, 324, 343, 402
See application file for complete search history.

(56) References Cited

U.S. PATENT DOCUMENTS

| 6,385,208 | B1 | 5/2002 | Findlater et al. |
| 7,042,893 | B1 | 5/2006 | Lo et al. |
| 7,672,326 | B1 * | 3/2010 | Lo et al. ........... 370/419 |

FOREIGN PATENT DOCUMENTS

| WO | WO 01/17166 A2 | 3/2001 |
| WO | WO 01/47188 A2 | 6/2001 |

* cited by examiner

*Primary Examiner* — Chi Pham
*Assistant Examiner* — Alexander Boakye

(57) ABSTRACT

A physical layer device includes a serial media independent interface (SMII). The SMII includes a first terminal configured to receive a first data stream. The first data stream is received at the first terminal in accordance with a first frequency. The SMII further includes a transmit circuit configured to (i) sample, on a rising edge of a clock, the first data stream received at the first terminal to generate a second data stream to be transmitted from the physical layer device, and (ii) sample, on a falling edge of the clock, the first data stream received at the first terminal to generate a third data stream to be transmitted from the physical layer device. Each of the second data stream and the third data stream has a second frequency, and the first frequency is twice the second frequency.

6 Claims, 6 Drawing Sheets

PHYSICAL LAYER DEVICE INCLUDING A SERIAL MEDIA INDEPENDENT INTERFACE (SMII)

CROSS-REFERENCE TO RELATED APPLICATIONS

This application is a continuation of U.S. patent application Ser. No. 11/378,551, filed on Mar. 17, 2006 (now U.S. Pat. No. 7,672,326), which is a continuation of U.S. patent application Ser. No. 10/010,732 (now U.S. Pat. No. 7,042,893), filed on Dec. 5, 2001. The disclosures of the above application are incorporated herein by reference.

FIELD

This invention relates to network interfaces, and more particularly to serial media independent interfaces (SMII).

BACKGROUND

As computer systems continue to evolve, an increasing number of computers are interconnected in local area networks that are based on the Ethernet standard. Ethernet networks may employ different types of physical media such as twisted copper, fibre, 10 Mbit, and 100 Mbit to physically interconnect the computers. The media independent interface (MII) is a specification that defines a standard interface for flow control and data transfer between a media access control layer (MAC) and any of the physical layers (PHY) that interface with the physical media of an Ethernet network. The MII has evolved to include a reduced media independent interface (RMII) that reduced the pin-count of the interface to permit smaller, lower cost devices. The MII has further evolved beyond the RMII to include a serial-MII (SMII) specification that further reduces pin-count. SMII allows multi-port communication with a single system clock. However, SMII requires two pins per port to convey complete MII information between a PHY and a MAC.

SUMMARY

An SMII circuit to communicate data synchronous with a clock signal having a rising edge and a falling edge. The SMII circuit includes a transmit circuit that is responsive to the clock signal to generate a first transmit serial stream and a second transmit serial stream. A receive circuit, responsive to the clock signal, to generate a receive serial stream from two receive data streams. The receive serial stream having a operating frequency that is about twice the operating frequency of each of the two receive data streams. Transmit and receive ports corresponding to the transmit and receive circuits each include a single pin to communicate the serial transmit data and the receive serial stream.

The details of one or more embodiments of the invention are set forth in the accompanying drawings and the description below. Other features, objects, and advantages of the invention will be apparent from the description and drawings, and from the claims.

Further areas of applicability will become apparent from the description provided herein. It should be understood that the description and specific examples are intended for purposes of illustration only and are not intended to limit the scope of the present disclosure.

DRAWINGS

Like reference symbols in the various drawings indicate like elements.

DETAILED DESCRIPTION

Figure 1:
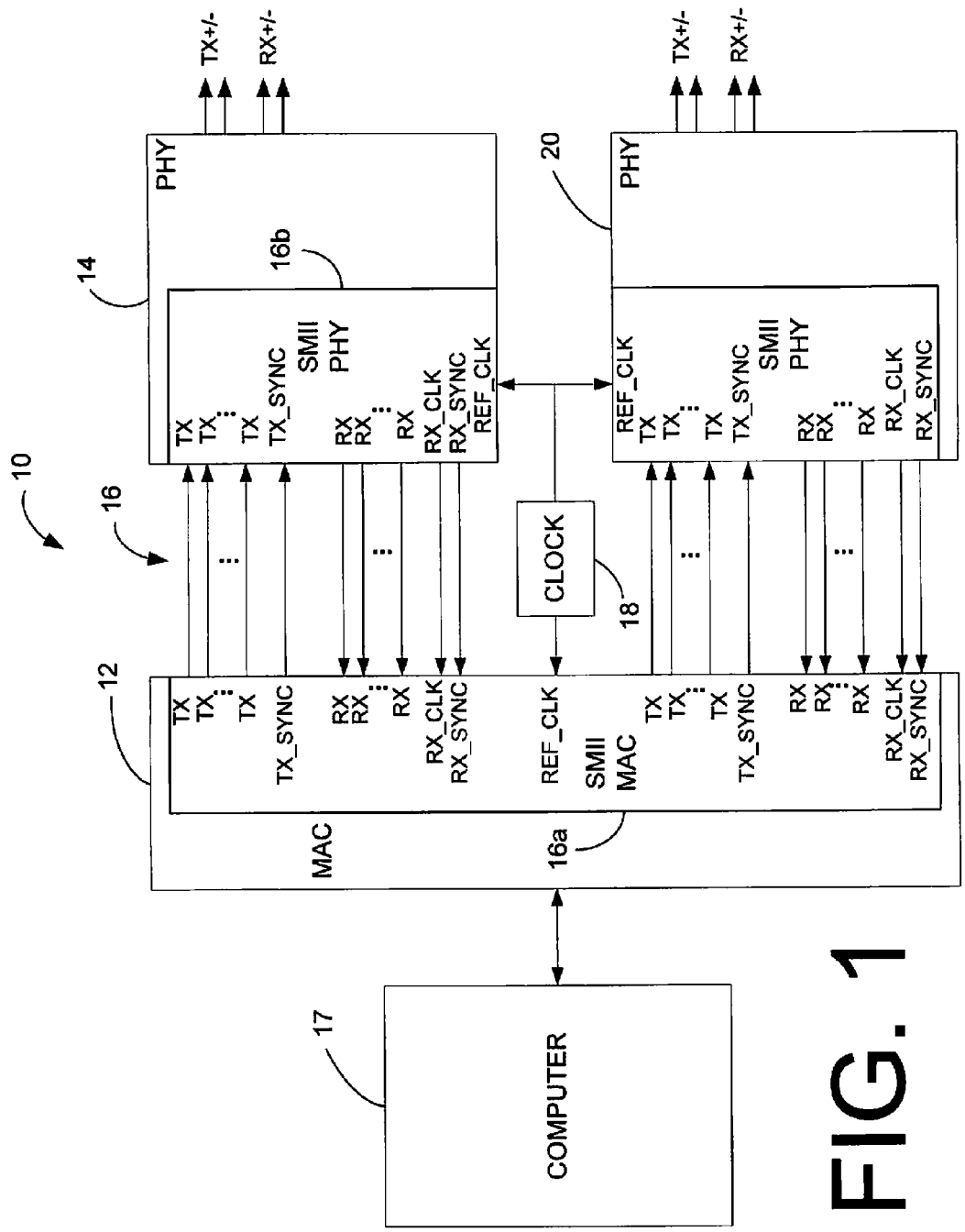
FIG. 1 illustrates a block diagram of a double data rate SMII system.

FIG. 1 shows a network interface circuit 10 including a MAC 12 interconnected with a PHY 14 through a double data rate SMII 16 that may include a MAC component 16a and a PHY component 16b. The network interface circuit 10 interfaces one or more Ethernet network ports to a computer 17. The network interface circuit 10 may be implemented on a peripheral device such as a network interface card and as an integral portion of the computer 17 such as on a motherboard of the computer 17. The double data rate SMII 16 supports Ethernet 10/100 physical layers and may communicate complete MII information between the MAC 12 and the PHY 14. The SMII 16 provides unidirectional communication between the MAC 12 and PHY 14 through one or more ports and advantageously only requires an average of one pin per port. In a conventional unidirectional system, two pins for port would be required, one pin for transmit and one pin for receive. Instead, the SMII interleaves transmit signals from pairs of ports through one pin, and interleaves receive signals from the pairs of ports on other pins, so that pairs of ports share two pins to communicate receive and transmit data. Therefore, by sharing pins between ports, an average of one pin per port is required to support multiple ports. Requiring only a single pin per port instead of the two pins per port required by conventional SMII significantly reduces the pin count required for the MAC 12 and PHY 14, permitting an increase in the quantity of Ethernet ports that are supported by each within given device profiles. For example, a MAC or PHY used for a 24 port hub would require 24 fewer pins without eliminating functionality.

The double data rate SMII 16 only requires a single clock 18 to maintain communication between the MAC 12 and the PHY 14. The clock 18 preferably operates at approximately 125 MHz. However, the clock frequency is not limiting and other frequencies both greater than and less than 125 MHz may be used. The double data rate SMII 16 is preferably included within the PHY 14 and MAC 12 so that the advantages of reduced pin count can be used to either reduce package size or increase the quantity of ports that are supported by the PHY 14 and MAC 12. Additional PHYs 20 or MACs may be operated from the same clock 18 to further increase the quantity of ports that are supported by the double data rate SMII 16.

Figure 2:
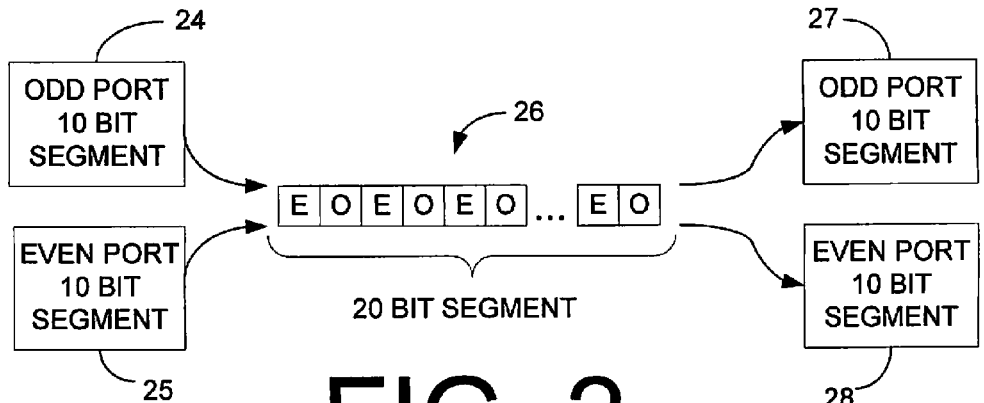
FIG. 2 illustrates interleaving signals from an even port and an odd port.

FIG. 2 illustrates interleaving a 10 bit segment 24 from an even port with a 10 bit segment 25 from an odd port to form a 20 bit segment 26 that is communicated through a single pin between a MAC and a device such as a PHY or another MAC. The 20 bit segment 26 is communicated through the single pin at twice the frequency of the 10 bit segments 24 and 25. The 20 bit segment 26 is then separated into two 10 bit segments 27 and 28.

Figure 3A:
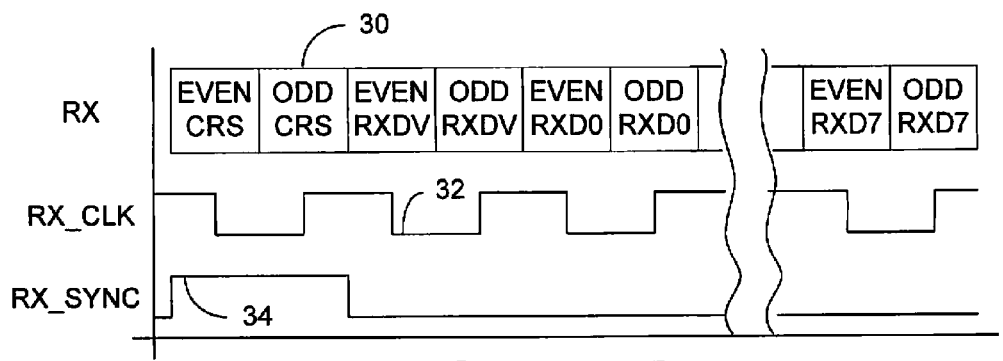
FIG. 3A illustrates a receive sequence diagram for a double data rate SMII.

FIG. 3A shows a receive sequence diagram for the double data rate SMII 16. The receive sequence diagram depicts the relation between received bits RXD 30, a RX_CLK 32, and an RX_SYNC 34. The received bits are latched in on both the positive-going clock edges and the negative-going clock edges. The received bits 30 are sent as 20 bit segments. The RX_SYNC 34 is generated by the PHY 14 every 10 clock cycles to delimit the boundaries of the bit segments.

Figure 3B:
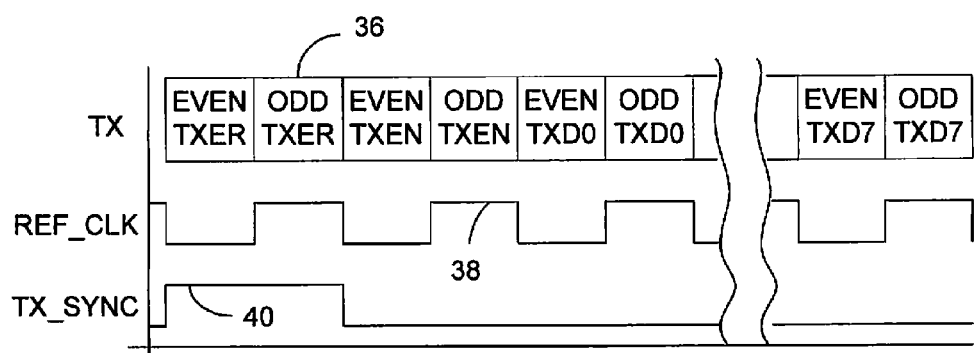
FIG. 3B illustrates a transmit sequence diagram for a double data rate SMII.

FIG. 3B shows a transmit sequence diagram for the double data rate SMII 16. The transmit sequence diagram depicts the relation between transmitted bits TXD 36, a REF_CLK 38, and a TX_SYNC 40. The transmitted bits are sampled on both the positive-going clock edges and the negative-going clock edges. The transmitted bits 36 are sent as 20 bit segments. The TX_SYNC 40 is generated by the MAC 12 every 10 clock cycles to delimit the boundaries of the bit segments. The PHY 14 preferably delimits the segments based on the positive-going edge of the TX_SYNC 40 and ignores the negative-going edge of TX_SYNC 40.

Figure 4A:
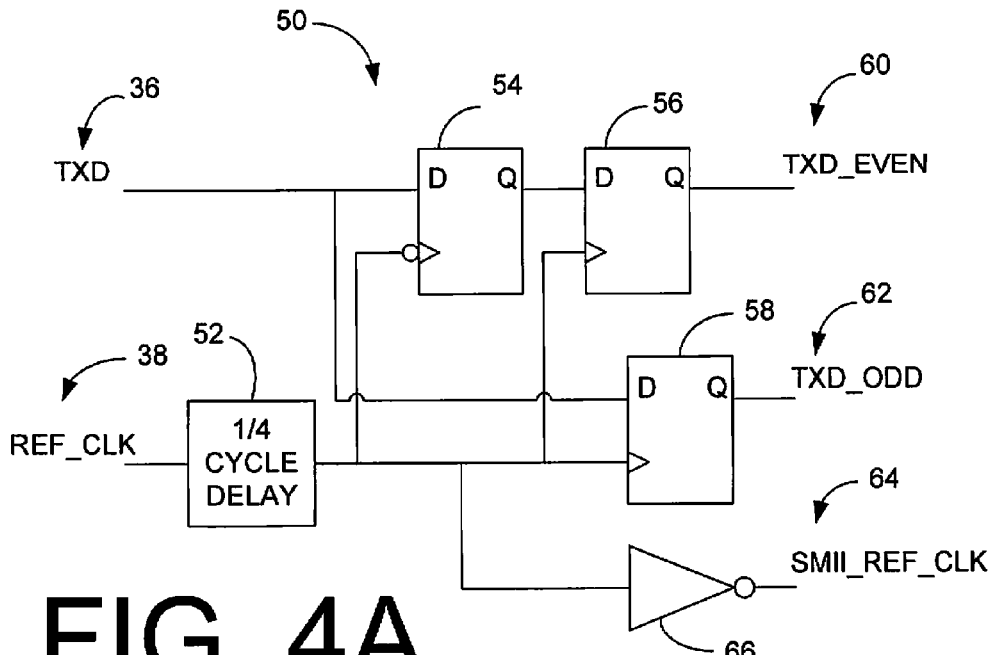
FIG. 4A illustrates a block diagram of a PHY transmit circuit for a double data rate SMII.

FIG. 4A shows an embodiment of a PHY transmit circuit 50 portion of the double data rate SMII 16. The transmit circuit 50 uses a clock signal having a first operating frequency, such as 125 MHz, to generate two data streams that each have a frequency that is equal to the first operating frequency from a data stream having a frequency that is twice the first operating frequency. Inputting the data stream at about twice the first operating frequency permits a single pin to be used per port. Data may be latched using both the rising-edge and the falling edge of the clock signal to generate the lower frequency data streams.

The PHY transmit circuit 50 receives the REF_CLK 38 and transmit data, TXD, 36 from the MAC 12. The REF_CLK 38 is input to a delay circuit 52 that generates a clock signal output that is delayed a quarter cycle. The output of the delay circuit 52 is coupled to latches 54-58 to generate TXD_EVEN 60 and TXD_ODD 62 from TXD 36. TXD_EVEN 60 and TXD_ODD 62 may be processed by standard physical layer techniques to generate the transmitted Ethernet compliant signal. An inverter 64 generates the SMII_REF_CLK 66 from the delay circuit output.

Figure 4B:
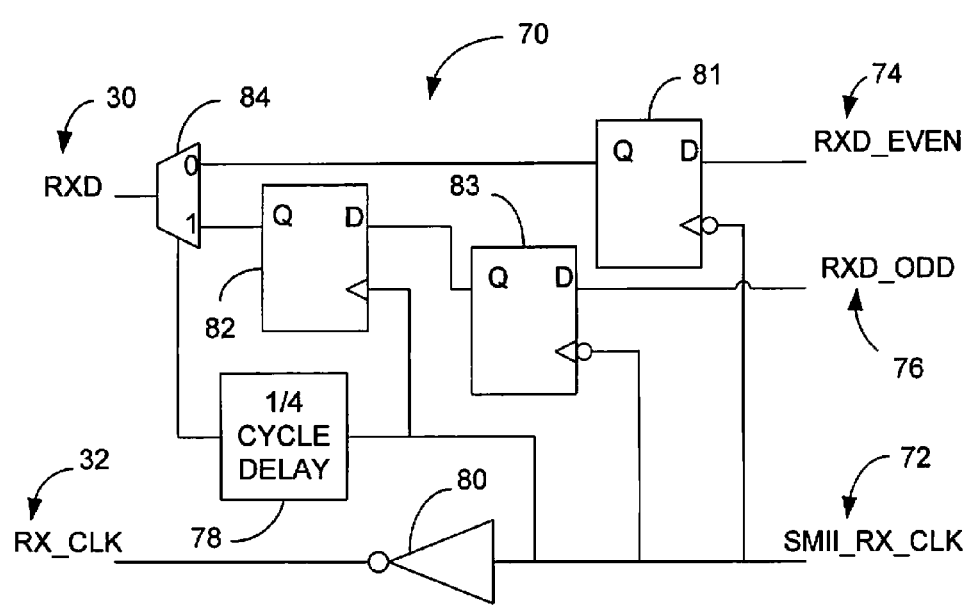
FIG. 4B illustrates a block diagram of a PHY receive circuit for a double data rate SMII.

FIG. 4B shows an embodiment of a PHY receive circuit 70 portion of the double data rate SMII 16. The PHY receive circuit 70 uses a clock signal having a first operating frequency, such as 125 MHz, to generate a data stream having a frequency that is twice the first operating frequency from two data streams that each have an operating frequency that is equal to the first operating frequency. Generating the data stream with a frequency that is twice the first operating frequency permits a single pin to be used per port. Data may be latched in using both the rising-edge and the falling edge of the clock signal to generate the higher frequency data stream.

The PHY receive circuit 70 receives the SMII_RX_CLK 72 and two receive data streams, RXD_EVEN 74 and RXD_ODD 76, from processing circuits within the PHY 14. The SMII_RX_CLK 72 is input to a delay circuit 78, an inverter 80, and a latch 82. The inverter 80 generates RX_CLK 32. Latches 81-83 latch in data from RXD_EVEN 74 and RXD_ODD 76. The delay circuit 78 generates a clock signal output that is delayed a quarter cycle. A combiner 84 combines latched data from RXD_EVEN 74 and RXD_ODD 76 to generate RXD 30. The PHY receive circuit 70 transmits the RX_CLK 38 and receive data, RXD, 30 to the MAC 12.

Figure 5A:
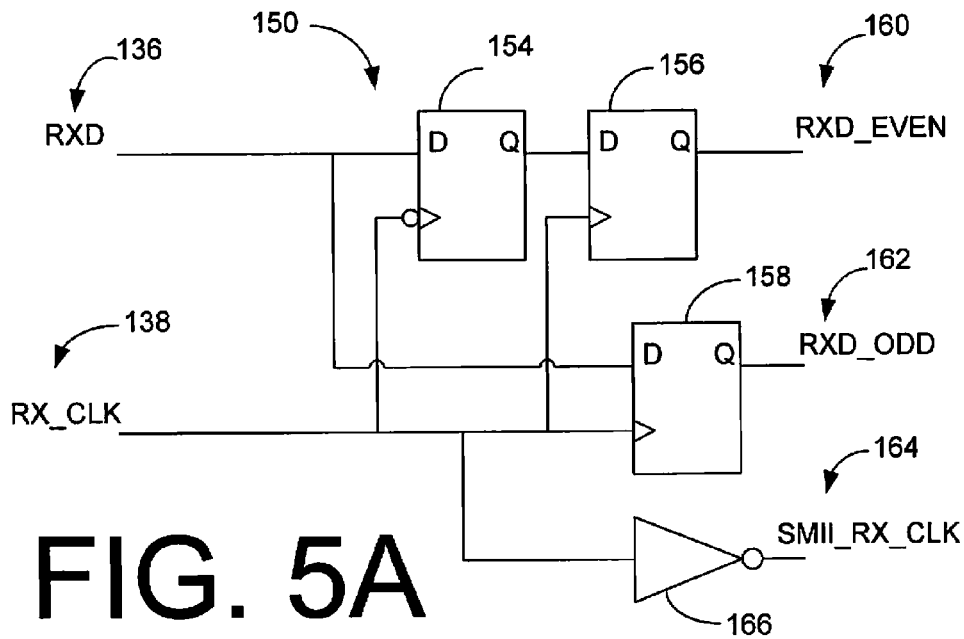
FIG. 5A illustrates a block diagram of a MAC receive circuit for a double data rate SMII.

FIG. 5A shows an embodiment of a MAC receive circuit 150 portion of the double data rate SMII 16. The MAC receive circuit 150 uses a clock signal having a first operating frequency, such as 125 MHz, to generate two data streams that each have a frequency that is equal to the first operating frequency from a data stream having a frequency that is twice the first operating frequency. Receiving the data stream at about twice the first operating frequency permits a single pin to be shared by two ports. Data may be latched using both the rising-edge and the falling edge of the clock signal to generate the lower frequency data streams.

The MAC receive circuit 150 receives the RX_CLK 138 and receive data, RXD, 36 from the PHY 14. The RX_CLK 138 is coupled to latches 154-158 to generate RXD_EVEN 160 and RXD_ODD 162 from RXD 136. RXD_EVEN 160 and RXD_ODD 162 may be processed by standard MAC layer techniques. An inverter 164 generates the SMII_RX_CLK 166 from the RX_CLK 138.

Figure 5B:
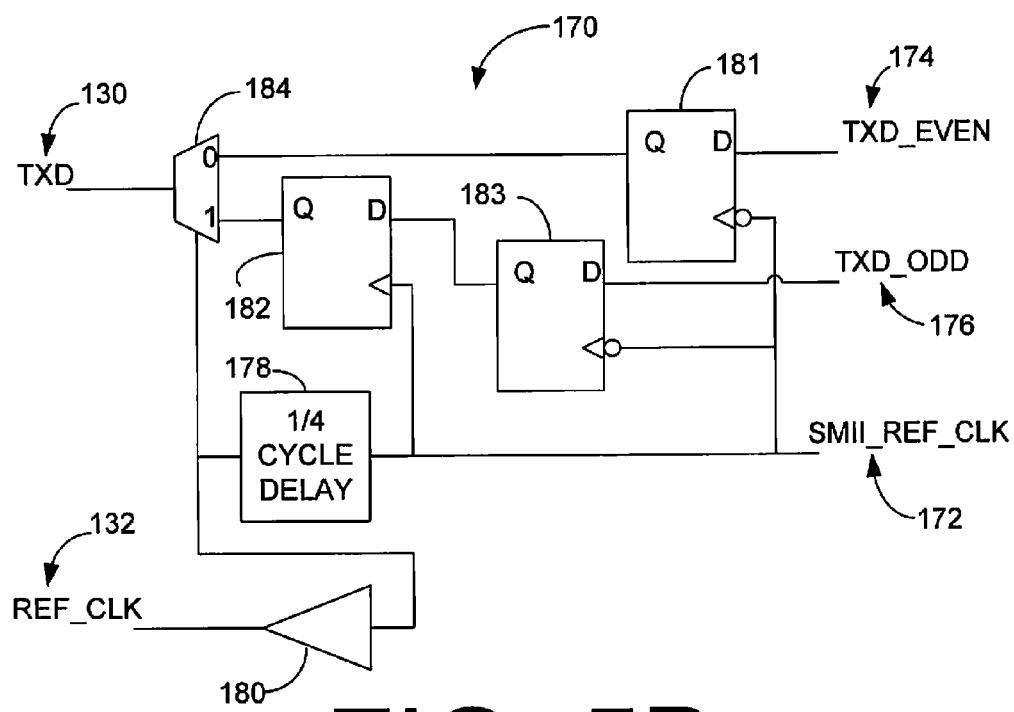
FIG. 5B illustrates a block diagram of a MAC transmit circuit for a double data rate SMII.

FIG. 5B shows an embodiment of a MAC transmit circuit 170 portion of the double data rate SMII 16. The MAC transmit circuit 170 uses a clock signal having a first operating frequency, such as 125 MHz, to generate a data stream having a frequency that is twice the first operating frequency from two data streams that each have an operating frequency that is equal to the first operating frequency. Generating the data stream with a frequency that is twice the first operating frequency permits a single pin to be shared by two ports. Data may be latched in using both the rising-edge and the falling edge of the clock signal to generate the higher frequency data stream.

The MAC transmit circuit 170 receives the SMII_REF_CLK 172 and two receive data streams, TXD_EVEN 174 and TXD_ODD 176, from processing circuits within the MAC 12. The SMII_REF_CLK 172 is input to a delay circuit 178 and latches 181-183. A buffer 180 coupled to the output of the delay circuit 178 generates REF_CLK 132. Latches 181-183 latch in data from TXD_EVEN 174 and TXD_ODD 176. The delay circuit 178 generates a clock signal output that is delayed a quarter cycle. A combiner 184 combines latched data from TXD_EVEN 174 and TXD_ODD 176 to generate TXD 130. The MAC transmit circuit 170 transmits the TX_CLK 138 and transmit data, TXD, 130 to the PHY 14.

Figure 6:
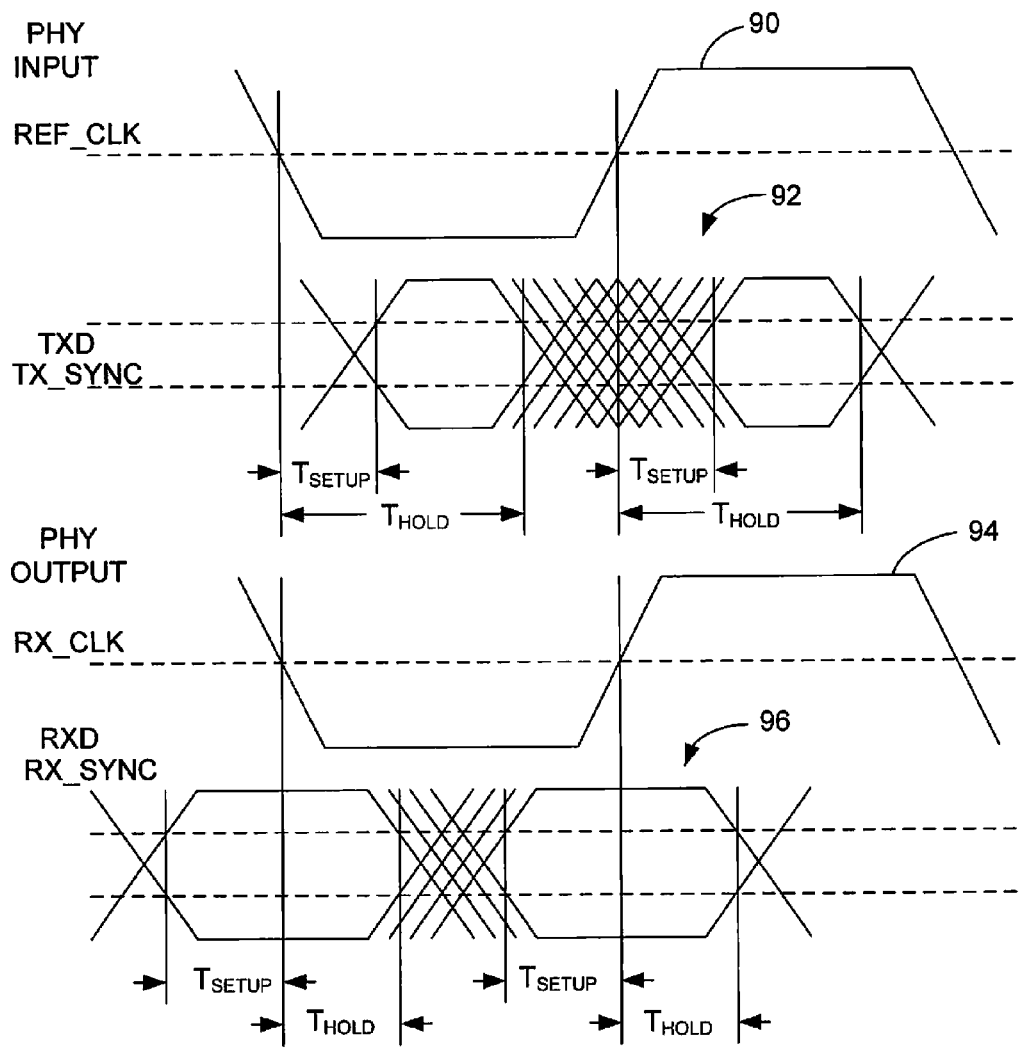
FIG. 6 illustrates timing diagrams for PHY inputs and outputs.

FIG. 6 shows timing diagrams for outputs and inputs of the PHY 14. The PHY inputs show the timing relation between the REF_CLK 90 and the TXD and TX_SYNC 92. For the PHY inputs the preferable values for Tsetup and Thold are −0.9 nsec and 2.7 nsec respectively. The PHY outputs show the timing relation between the RX_CLK 94 and RXD and RX_SYNC 96. For the PHY outputs the preferable values for Tsetup and Thold are 1.4 nsec and 1.2 nsec respectively. The duty cycle of RX_CLK is preferably 3.6 nsec minimum and 4.4 nsec maximum.

Figure 7:
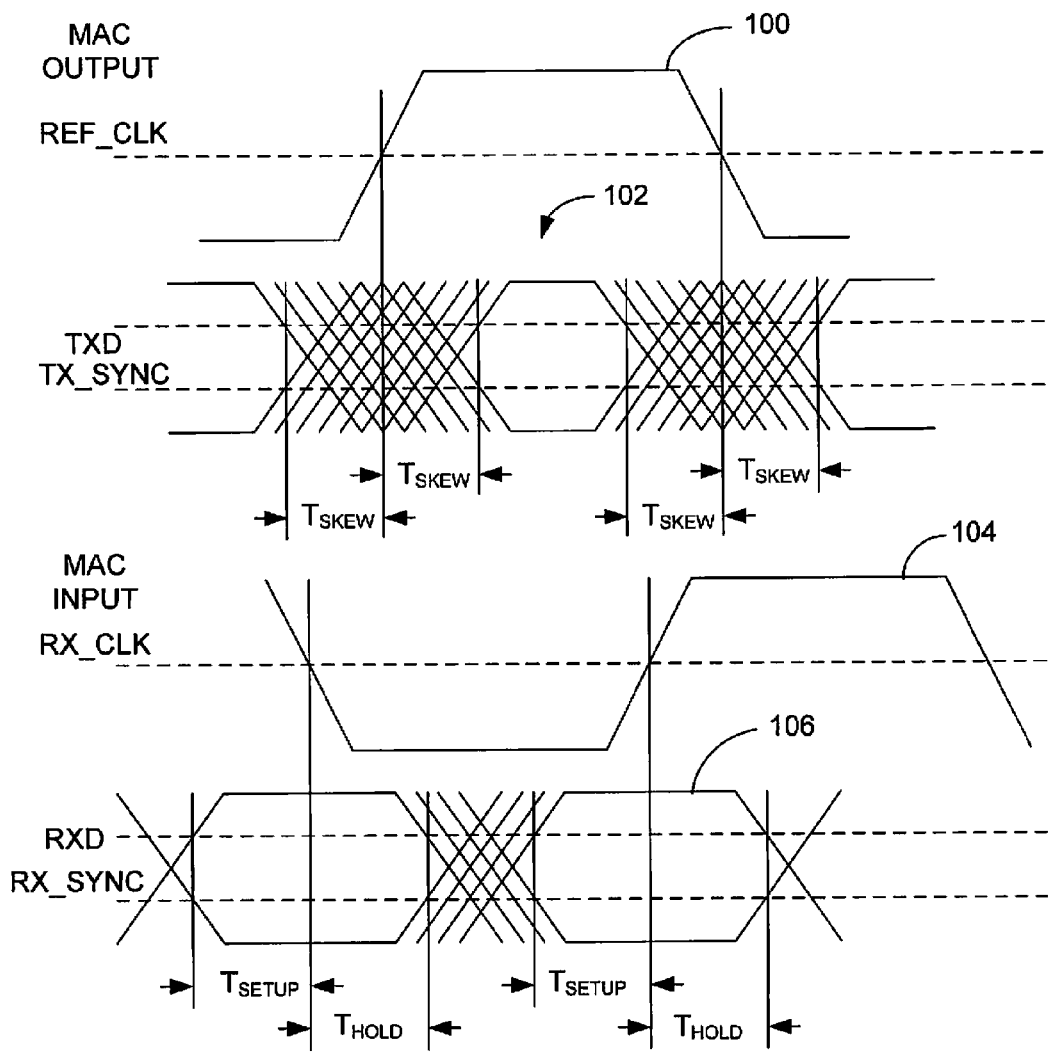
FIG. 7 illustrates timing diagrams for MAC inputs and outputs.

FIG. 7 shows timing diagrams for outputs and inputs of the MAC 12. The MAC outputs show the timing relation between the REF_CLK 100 and the TXD and TX_SYNC inputs 102. For the MAC outputs the preferable value for Tskew is 0.5 nsec. The MAC inputs show the timing relation between the RX_CLK 104 and the RXD and RX_SYNC 106. For the MAC inputs the preferable values for Tsetup and Thold are 1.0 nsec and 0.8 nsec respectively. The duty cycle of RX_CLK is preferably 3.6 nsec minimum and 4.4 nsec maximum.

A number of embodiments of the invention have been described. Nevertheless, it will be understood that various modifications may be made without departing from the spirit and scope of the invention. For example, the interface may interface a MAC to a MAC as well as a MAC to a PHY. Accordingly, other embodiments are within the scope of the following claims.

What is claimed is:

1. A physical layer device comprising:
a serial media independent interface, wherein the serial media independent interface includes
a first terminal configured to receive a first data stream, wherein the first data stream is received at the first terminal in accordance with a first frequency; and
a transmit circuit configured to
sample, on a rising edge of a clock, the first data stream received at the first terminal to generate a second data stream to be transmitted from the physical layer device, and
sample, on a falling edge of the clock, the first data stream received at the first terminal to generate a third data stream to be transmitted from the physical layer device,
wherein each of the second data stream and the third data stream has a second frequency, and wherein the first frequency is twice the second frequency.

2. The physical layer device of claim 1, wherein the serial media independent interface further includes:
a receive circuit configured to
receive (i) a fourth data stream in accordance with the second frequency and (ii) a fifth data stream in accordance with the second frequency, and
generate a sixth data stream having the first frequency based on each of (i) the fourth data stream and (ii) the fifth data stream; and
a second terminal configured to receive the sixth data stream.

3. The physical layer device of claim 2, wherein each of the fourth data stream and the fifth data stream corresponds to data received by the physical layer device.

4. The physical layer device of claim 3, wherein the physical layer device comprises an Ethernet physical layer device.

5. A network interface circuit comprising:
the physical layer device of claim 3; and
a media access control layer in communication with the physical layer device via the serial media independent interface.

6. The network interface circuit of claim 5, wherein the sixth data stream is sent from the physical layer device to the media access control layer via the second terminal.

* * * * *